United States Patent
Hadba et al.

(10) Patent No.: US 6,983,338 B2
(45) Date of Patent: Jan. 3, 2006

(54) COUPLING DEVICE FOR CONNECTORS WHEREIN COUPLING DEVICE COMPRISES MULTIPLEXER UNIT FOR SELECTIVING FIRST MODE FOR SATA CHANNEL AND SECOND MODE THAT ESTABLISHES LOOP BACK FUNCTION

(75) Inventors: Amer Hadba, Round Rock, TX (US); Jason M. Lau, Austin, TX (US); John S. Loffink, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 41 days.

(21) Appl. No.: 10/404,264

(22) Filed: Apr. 1, 2003

(65) Prior Publication Data

US 2004/0203295 A1 Oct. 14, 2004

(51) Int. Cl.
*G06F 13/00* (2006.01)
*G06F 12/00* (2006.01)

(52) U.S. Cl. .............................. 710/74; 710/62; 710/72; 710/73; 710/11; 711/112; 711/114

(58) Field of Classification Search ............. 710/72–74, 710/112, 114, 11; 711/103, 104
See application file for complete search history.

(56) References Cited

U.S. PATENT DOCUMENTS

| 4,801,920 | A | 1/1989 | Ohba et al. ................. 340/781 |
| 5,870,621 | A | 2/1999 | Walsh et al. ............ 395/820.32 |
| 6,217,228 | B1 | 4/2001 | Samela et al. ................. 385/59 |
| 6,687,775 | B1 | 2/2004 | Bassett ......................... 710/77 |
| 6,702,620 | B2 | 3/2004 | Lynch et al. ................. 439/638 |
| 6,721,819 | B2 | 4/2004 | Estakhri et al. ................ 710/11 |
| 6,743,054 | B2 | 6/2004 | Wu .............................. 439/638 |
| 6,790,079 | B2 | 9/2004 | Berens et al. ............... 439/534 |
| 2003/0074515 | A1 * | 4/2003 | Resnick ....................... 710/313 |
| 2003/0110330 | A1 | 6/2003 | Fujie et al. ................... 710/36 |
| 2003/0193776 | A1 | 10/2003 | Bicknell et al. ............ 361/685 |
| 2004/0081179 | A1 * | 4/2004 | Gregorcyk, Jr. ............ 370/402 |
| 2004/0103242 | A1 * | 5/2004 | Teng ........................... 711/104 |
| 2004/0158669 | A1 * | 8/2004 | Weng et al. ................. 711/103 |
| 2004/0162926 | A1 * | 8/2004 | Levy ........................... 710/74 |
| 2004/0197047 | A1 | 10/2004 | Hadba et al. ................. 385/17 |

OTHER PUBLICATIONS

"Serial ATA in Servers and Networked Storage", 2002.

* cited by examiner

*Primary Examiner*—Tammara Peyton
(74) *Attorney, Agent, or Firm*—Baker Botts L.L.P.

(57) ABSTRACT

A coupling device for a SATA drive having a SATA connector is disclosed. The coupling device comprises a second connector having a plurality of connector pins, wherein the SATA connector has a number of connector pins which are less than the number of pins of the second connector and wherein the second connector provides a first and second SATA channel, and a coupling unit for coupling the first and the second connector, wherein the coupling unit comprises a multiplexer unit for establishing a coupling of one of the SATA channels with the SATA drive or for establishing a loop back function by coupling the first and second SATA channel.

14 Claims, 6 Drawing Sheets

COUPLING DEVICE FOR CONNECTORS WHEREIN COUPLING DEVICE COMPRISES MULTIPLEXER UNIT FOR SELECTIVING FIRST MODE FOR SATA CHANNEL AND SECOND MODE THAT ESTABLISHES LOOP BACK FUNCTION

FIELD OF THE INVENTION

The present invention relates to a coupling device for an electronic device in particular for a SATA hard drive.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Modern information handling systems include so-called cluster technology. Clustering is most widely recognized as the ability to combine multiple systems in such a way that they provide services a single system could not. Clustering is used to achieve higher availability, scalability and easier management. Higher Availability can be achieved by use of "failover" clusters, in which resources can automatically move between 2 or more nodes in the event of a failure. Scalability can be achieved by balancing the load of an application across several computer systems. Simpler management can be attained through the use of virtual servers, as opposed to managing each individual computer system. For example, a high availability clustering joins together two or more servers to help ensure against system failures including planned shutdowns (e.g., maintenance, backups) and unplanned outages (e.g., system failure, software failure, operator errors). The group of connected systems is known as a cluster. High Performance Computing Cluster (HPCC) combines multiple Symmetric Multi-Processor (SMP) computer systems together with high-speed interconnects to achieve the raw-computing power of classic "big-iron" supercomputers. These clusters work in tandem to complete a single request by dividing the work among the server nodes, reassemble the results and present them to the client as if a single-system did the work. The HPC clusters are used for solving the most challenging and rigorous engineering tasks facing the present era. The parallel applications running on HPC are both numeric and data intensive and require medium to high-end industry standard computing resources to fulfill today's computational needs. Since HPC has such a strong implementation, the demand for it is growing at a tremendous speed and is becoming highly popular in all aspects. Scalable Clusters provide the freedom of adding compute nodes in a cluster in order to increase the joint resources of processing. This can add to the power of computation since processors within a cluster can communicate data more efficiently and hence it also can reduce the average memory access time. This is particularly attractive when running parallel applications.

In modern information handling systems, such as Servers and Network Storage devices the Serial ATA standard will replace the current parallel ATA interface. Serial ATA (SATA) is a point-to-point connection and allows multiple ports to be aggregated into a single controller that is typically located either on the motherboard or as an add-in, RAID card. Through backplanes and external enclosures, Serial ATA will be deployed in high-capacity server and networked-storage environments such as the above described cluster systems. However, the SATA backplane interface connector is not as robust as the other connectors because its primary usage is designed for internal use within a computer system. However, external storage systems, in particular, for cluster systems have to use this type of connection when using SATA hard drives. Therefore, multiple connection disconnection operation might affect the reliabilty of the connection. Furthermore, the connector pins of SATA as currently defined do not allow for dual port support when the connector is installed directly on the backplane of a system. Therefore, failover and load balancing functionality cannot be implemented. These functions generally allow the control and access of one device by multiple controlling devices as mentioned above.

SUMMARY OF THE INVENTION

Therefore, a need for an improved connection for SATA systems exists. To provide an improved connection the present invention This object can be achieved by a coupling device for a SATA drive having a SATA connector, comprising a second connector having a plurality of connector pins, wherein the SATA connector has a number of connector pins which are less than the number of pins of the second connector and wherein the second connector provides a first and second SATA channel, and a coupling unit for coupling the first and the second connector, wherein the coupling unit comprises a multiplexer unit for establishing a coupling of one of the SATA channels with the SATA drive or for establishing a loop back function by coupling the first and second SATA channel.

The coupling unit may comprise a comparator for comparing a drive identification number provided by the second connector with a predetermined drive number. The second connector can be a fibre channel connector. The coupling unit may receive control signals from the second connector to either couple a first or a second SATA channel with the SATA drive. The multiplexer configuration may comprise a first multiplexer for either coupling the transmit lines of first or second SATA channel with the SATA drive and a second and third multiplexer for either establishing a loop back function or coupling the receiving lines of the first or second SATA channel with the SATA drive. The device may further comprise a voltage regulator for supplying a supply voltage to the components, wherein the supply voltage is received from one of the excess pins of the second connector.

The object may also be achieved by a storage system comprising a plurality of SATA drives, wherein each SATA drive comprises a coupling device for the SATA drive having a SATA connector, a second connector having a plurality of connector pins, wherein the SATA connector has a number of connector pins which are less than the number of pins of the second connector and wherein the second connector provides a first and second SATA channel, and a coupling unit for coupling the first and the second connector, wherein the coupling unit comprises a multiplexer unit for establishing a coupling of one of the SATA channels with the SATA drive or for establishing a loop back function by coupling the first and second SATA channel.

The second connector can be a fibre channel connector. The system may further comprise a backplane having a plurality of connectors for coupling for establishing connections with the respective second connectors. The backplane can comprise a mode select switch for determining a mode of operation coupled with each of the plurality of connectors. The system may further comprise at least one controller for controlling the operation of the plurality of SATA drives, wherein the controller comprises a SATA bridge for coupling a server with the system. Two controllers can be provided and wherein each controller may control the first or the second SATA channel of each coupling device. Each of the plurality of connectors may provide information about the drive identification number. The system may further comprise a supply voltage unit providing a supply voltage through one of the excess pins of the second connector.

Other technical advantages of the present disclosure will be readily apparent to one skilled in the art from the following figures, descriptions, and claims. Various embodiments of the present application obtain only a subset of the advantages set forth. No one advantage is critical to the embodiments.

BRIEF DESCRIPTION OF THE DRAWINGS

A more complete understanding of the present disclosure and advantages thereof may be acquired by referring to the following description taken in conjunction with the accompanying drawings, in which like reference numbers indicate like features, and wherein.

DETAILED DESCRIPTION OF THE PREFERRED EMBODIMENTS

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
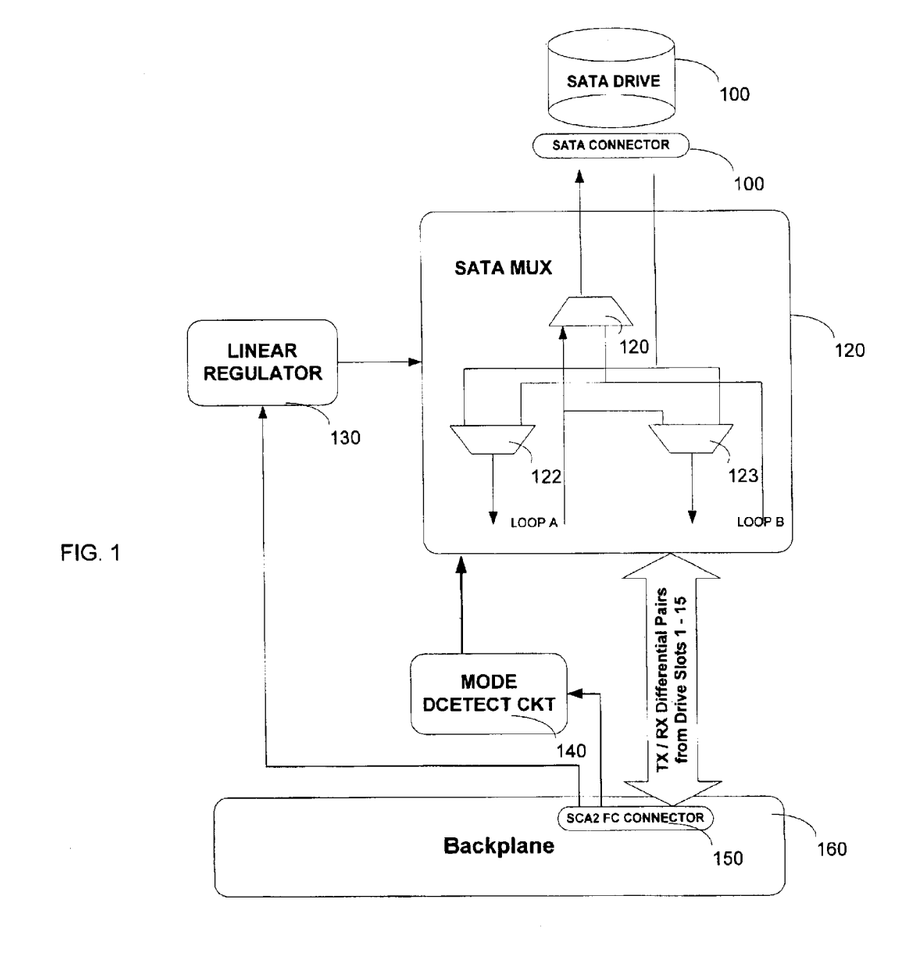
FIG. 1 is a block diagram of a interface directly coupled with a SATA device system including a server and a plurality of sub-systems.
Figure 2A:
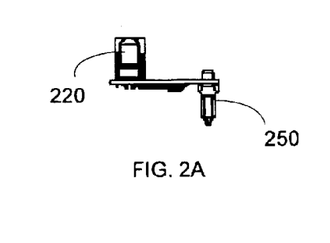
FIGS. 2A–D are side, front, and back views of a board including the interface according to the present invention.
Figure 2B:
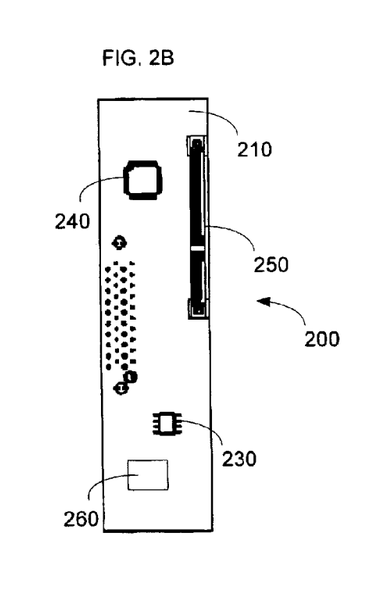
Figure 2C:
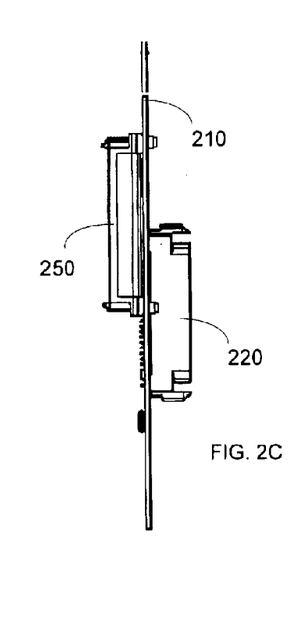
Figure 2D:
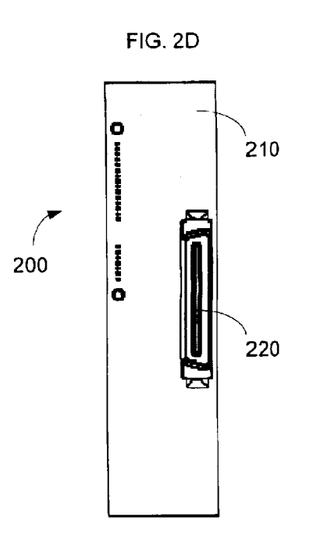

Turning to the drawings, exemplary embodiments of the present application will now be described. FIG. 1 shows a block diagram of an interface connector that allows to couple a SATA drive through a rugged fibre channel connector within an information handling system wherein the hard drive uses the less rugged SATA interface. SATA connections usually need only four single lines, two for sending and two for receiving signals. The fibre channel connecter provides a plurality of connections in excess of the four lines of SATA. Thus, in addition, according to the present invention, the fibre channel connector can be used to provide two separate SATA channels. Thus, according to an embodiment of the present invention, the SATA drive can be coupled within a cluster arrangement in which two systems will have access to the same drive. Furthermore, additional signals to control the switching between the SATA channels can be transmitted through a fibre channel connector.

A hard disk drive 100 having a serial ATA interface with a serial ATA connector 110 is directly coupled with a serial ATA coupling circuit 120. Three multiplexers each switching two signals according to the SATA connection standard are provided. To this end, the exemplary coupling circuit 120 comprises a first multiplexer 121 whose output is coupled with the two input lines of the SATA connector 110. The two output lines of the SATA connector 110 are coupled with the first input of a second multiplexer 122 and the second input of a third multiplexer 123. The output the second multiplexer 122 is coupled with the output of the first channel output Loop A. The output the third multiplexer 123 is coupled with the output of the second channel output Loop B. The input of the first channel Loop A is coupled with the first input of the first multiplexer 121 and the first input of the third multiplexer 123. In a similar way, the input of the second channel Loop B is coupled with the second input of the first multiplexer 121 and the second input of the second multiplexer 122. Loop A and Loop B are coupled through respective fibre channel connectors 150 which are provided within the a common serial backplane 160 of, for example, a storage array. Furthermore, an independent voltage supply 130 is shown in FIG. 1 to provide a supply voltage for the multiplexers in the coupling circuit 120. This independent voltage supply can comprise a linear voltage regulator 160 which receives a standard DC supply voltage of 5V and generates a regulated DC voltage of, for example, 3.3V. The independent voltage can be supplied through an additional connector pin in a fibre channel connector that is not used. To control the operation of the multiplexers within the coupling circuit 120 a mode detect circuit 140 is provided. The mode detect circuit 140 can, for example, control the status of the multiplexers depending on control signals provided through the fibre channel connector 150 and/or by analyzing a specific setting of respective switches provided in the backplane for setting a specific type of operation. To this end, a special mode switch in the backplane can define different modes of operation of the entire storage system. The switch can pull down or pull up specific indicator lines which also are fed through the fibre channel connector to each coupling circuit 120 to indicate the mode of operation. For example, if one indicator line is used, two different operating modes can be selected, if two lines are used, up to four different operating modes can be selected, etc.

During a first or normal mode the interface couples either Loop A or Loop B with the SATA connector 110. A host controller in the system connecting through Loop A or Loop B sends respective control signals which can be decoded by the mode detection circuit 140. The mode detection circuit then controls the multiplexers to couple the four lines of the SATA connector with either Loop A or Loop B supplied by the fibre channel connector. If Loop A is selected, multiplexer 121 and multiplexer 122 are controlled to select their first input, respectively. Thus, Loop B remains inactive and data is transferred through Loop A and the SATA connector in a normal fashion. If Loop B is selected, multiplexer 121 and multiplexer 123 are controlled to select their second inputs, respectively. Thus, Loop A remains inactive and data is transferred through Loop B and the SATA connector in a normal fashion.

During a second mode, the cluster mode, multiple drives are present in a plurality of slots. One controller usually controls drives through Loop A and a second controller controls drives through Loop B. In this mode the drive in the last slot is not used. However, a controller to controller communications channel is still needed for clustering in this slot. This communication can be created by coupling Loop A to Loop B. The controllers pass cluster-specific information back and forth through A and B and the drive is not used. This specific mode can be detected by the mode detection circuit 140 according to the setting of the mode switch on the backplane. To this end, the mode detection circuit compares the ID of the respective drive which is provided by the backplane through hardwired identification in the fibre channel connector 150 to determine whether this is the last drive in the unit. When this mode has been detected and the drive is the last drive, for example drive 15, in the unit, multiplexer 122 is controlled to select the second input and thus the output of Loop B is coupled with the input of Loop A. Furthermore, multiplexer 123 is controlled to select the first input. Thus, the output of Loop A is coupled with the input of Loop B. As stated above, the respective SATA drive is not used in this configuration. Also as stated above, the control over the multiplexers is usually done by the host controllers, except in cluster mode, where it is set in a loop-back mode by this auto-detection circuit 140.

Other modes of operation can be included depending on the capabilities of the respective controllers and/or drives that are implemented within the storage unit. Even though the coupling circuit has been described using three multiplexers, other configurations can be used, for example, to multiplex the SATA port of a hard drive or the respective coupling of an electronic device. Therefore, the present invention is not limited to the specific exemplary embodiment of the multiplexers shown in coupling circuit 120. Any other suitable coupling circuit can be used. For example, a plurality of tri-state buffers can be used to achieve a similar functionality. The coupling circuit can also be expanded to provide even more functionality depending on the requirement of the respective system.

FIGS. 2A–D shows an exemplary mechanical embodiment of the connecting device 200 according to the present invention. In FIGS. 2A–D a printed circuit board 210 operates as a carrier and comprises the SATA connector 250 on one side and the fibre channel connector 220 on the respective other side. The printed circuit board also comprises all necessary components for the coupling and their interconnection with each other and the connectors. For example, a first integrated circuit 240 may comprise all multiplexers and a second integrated circuit 230 may comprise the mode detector 140, for example, in form of a decoder. In addition, a voltage regulator 260 can be provided to supply the integrated circuits with the necessary supply voltage supplied by the fibre channel connector. The main voltage will be provided from an voltage supply source within the storage unit through one of the fibre channel connector pins. Any other suitable type of carrier can be provided, for example, a metal sheet can be used as a carrier and the control electronic can be provided on a separate circuit board mounted to the carrier. The connecting device 200 in form of such a small board can be attached, for example, with 2 screws to a hard disk carrier. However, other suitable mounting means can be provided. For example, integrated screws within the SATA connector 250 can be used to at least partly provide a coupling of the device with the SATA drive carrier. The SATA drive carrier will house usually a single SATA drive. The other side of the connecting device 200 provides a rugged fibre channel connector which can be unplugged and plugged many times in a secure manner to provide a solid connection to a backplane and in addition provides for additional signals necessary to run different operating modes. Therefore, one connecting device is needed for each SATA drive which is to be used in multiple SATA drive system.

The connecting device 200 stays permanently connected with the respective electronic device, such as the SATA hard drive. The first connector, here the SATA connector, has been primarily designed to provide a coupling within a computer which in very rare occasions has to be disconnected once the system has been assembled. Therefore, this type of connection does not provide for a rugged handling as other connectors. The second connector provides for a more secure/rugged connection in terms of allowing multiple disconnections/connections by plugging in and out a respective connector without affecting the connection proper. In modern information handling systems, such as servers, storage area networks etc., disconnections/connections will happen more frequently than in a personal computer system and, therefore, the SATA interface connectors do not provide a rugged connector as for example the fibre channel connector. In addition, the multiplexer circuit which couples the two type of connectors allows for a very flexible handling of the coupling of the two interface types, such as a selectable two channel mode and a loopback function in which the incoming signals from a first channel are looped back through the second channel and vice versa. To this end, a different connector type providing more connecting pins is used according to the present invention. Even though, the exemplary embodiment uses a fibre channel connector other connectors can be used that provide connections in excess to a simple SATA connection.

Any other electronic device which comprises a first connector and for which a user prefers a second type of connector can be improved by the present invention. A particular interface can be integrated within a carrier board which couples two types of connectors and can be permanently attached to the electronic device. The first connector will then permanently be connected with the respective connector of the device whereas the second connector provides for the desired type of connection. In addition, more functionality can be provided by using a second type of connector with a number of connecting pins in excess of the number of connecting pins of the first type. For example, a plurality of channels can be provided wherein the particular interface selects one of the channels to connect it to the respective first connector. Thus, the first connector can be quasi multiplied within the second connector.

Figure 3:
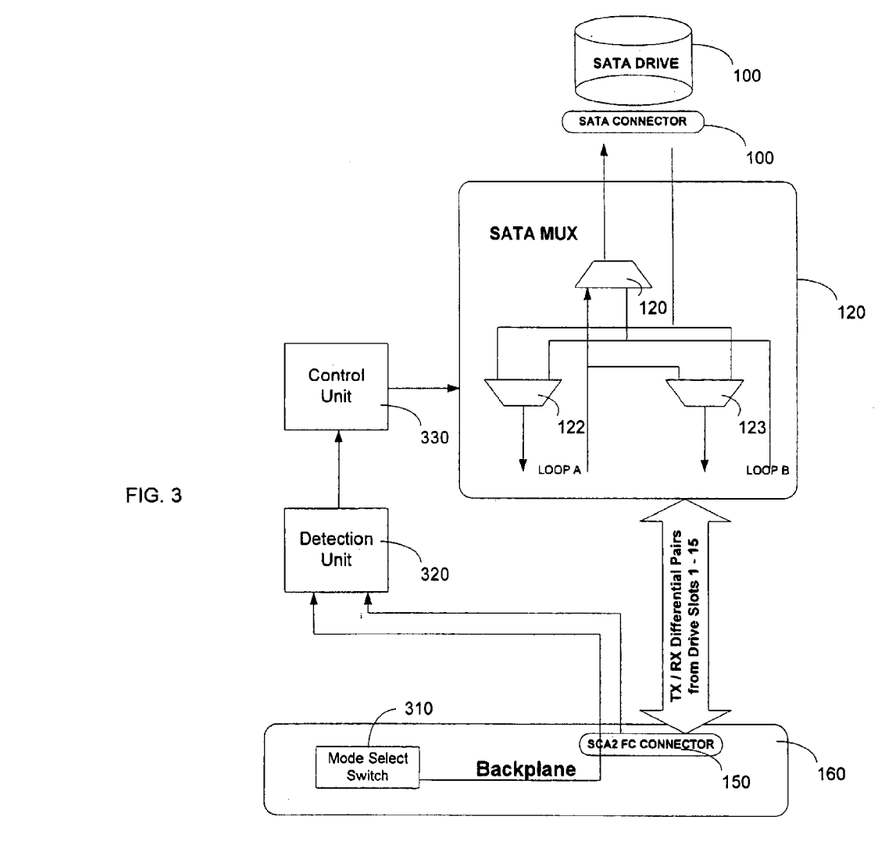
FIG. 3 shows a block diagram of an embodiment of an auto detect circuit according to the present invention.

FIG. 3 shows a partial embodiment of the mode detector circuit according to an exemplary embodiment of the present invention. This embodiment is used to detect the loop back function as explained above. The coupling device receives, for example, signals from a switch 310 located within the backplane to determine a mode of operation, for example a cluster or non-cluster mode of the respective device. This switch 310 can encode one or mor control lines which are coupled through fibre channel connector 150 with the detector unit 320. Detector unit 320 further receives some other signals through the fibre channel connector 150. For example, the backplane comprises a plurality of fibre channel connectors each coupling one SATA drive connection and the respective drive identification which is hardwired within repsective excess pins of the fibre channel connector. Furthermore, control signals for the multiplexer and supply voltage signals can be provided.

Detector unit 320 may, for example, comprise a comparator for comparing the drive identification number with a predefined slot number. Furthermore, a control unit 330 is provided to control the multiplexers 121, 122, and 123 of coupling circuit 120 which receives respective control signals from a controller.

Figure 4:
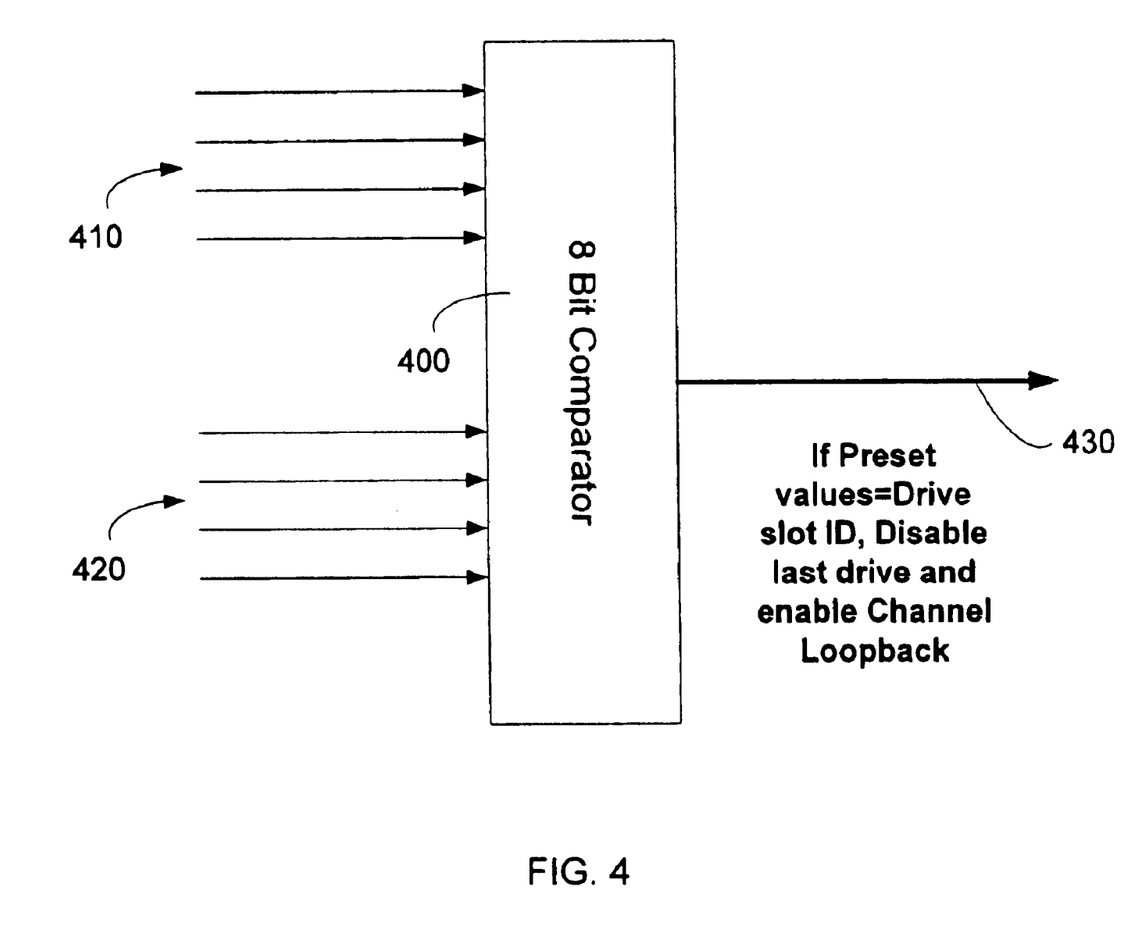
FIG. 4 shows an exemplary embodiment of an encoder which can be used in a device according to the present invention.

FIG. 4 shows an exemplary embodiment of the loop back detector. In this embodiment, an eight bit comparator is used to compare four preset value bits 410 with four bits 420 from the drive slot identifier. Depending on the result the output signal 430 indicates whether the a loopback function will be enabled or not. During the cluster mode, this comparator 400 compares the preset or actual drive identificantion number with the last drive slot identification information, for example drive number 15. In case of a match, this specific drive is ignored and the information sent will be looped back from loop A to loop B and vice versa.

Figure 5:
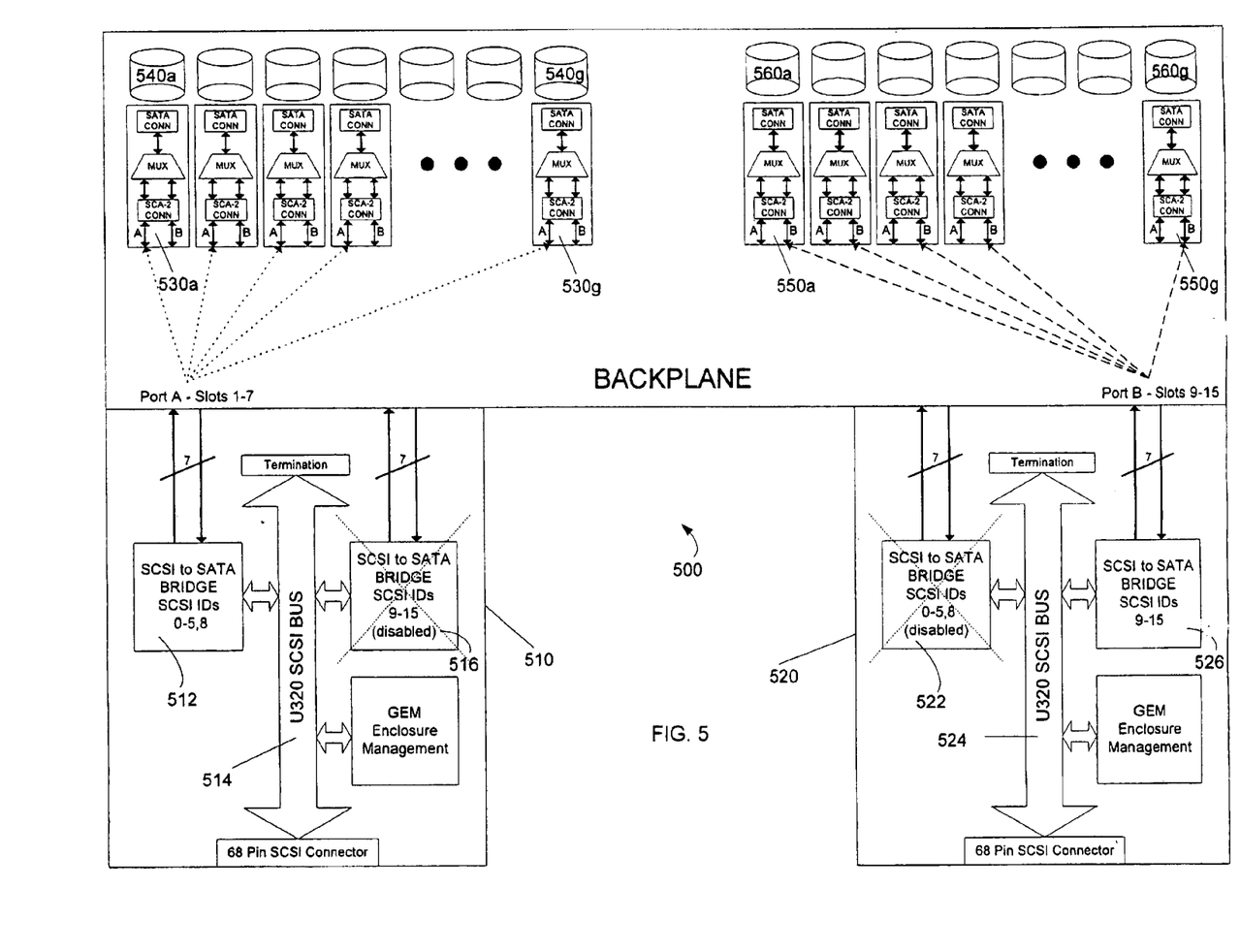
FIG. 5 shows an exemplary embodiment of a system in a first configuration using SATA drives according to the present invention.
Figure 6:
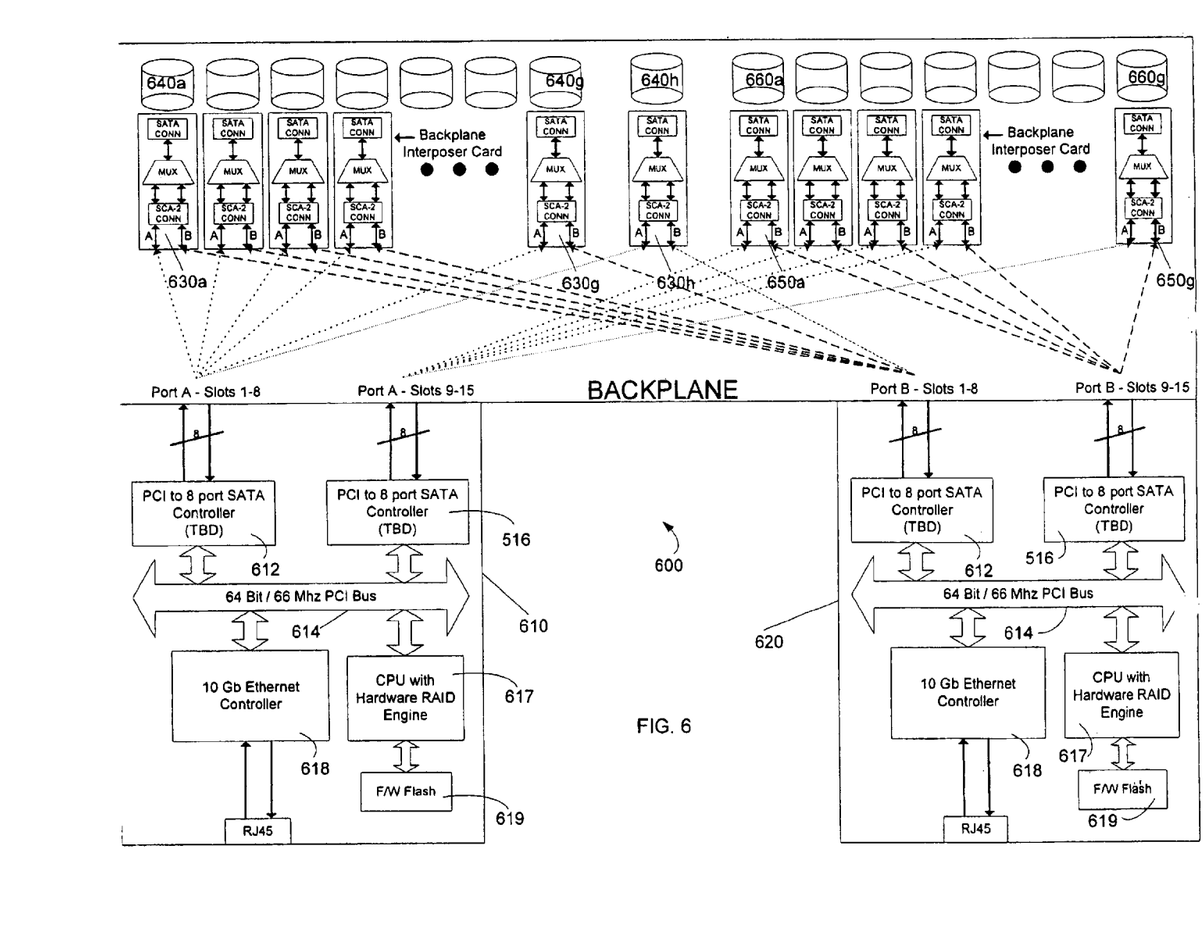
FIG. 6 shows an exemplary embodiment of a system in a first configuration using SATA drives according to the present invention.

The functionality of the coupling device will now be explained in combination with different embodiments of a storage disc system as shown in FIGS. 5 and 6. FIG. 5 shows a first exemplary embodiment using the coupling device according to the present invention. To this end, a storage disc system 500 comprises a plurality of, for example, 14 SATA drives 540a . . . 540g and 560a . . . 560g. Each SATA drive 540a . . . 540g and 560a . . . 560g comprises a coupling device 530a . . . 530g and 550a . . . 550g according to the present invention. The switch 310 (not shown) within the backplane is set to indicate normal operation mode. In this embodiment each server (not shown) can access seven disc drives of the storage disc system 500 through respective interfaces 510 and 520 included within the storage system 500. Each interface comprises, for example, a bus 514, 524. The bus 514, 524 can be a PCI bus, a SCSI (small computer system interface), or any other appropriate bus for coupling the the respective server with the storage system. The interface can also use an Ethernet connection or fibre channel connection. Each interface card 510, 520 comprises respective bridge devices 512, 516, 522, 526. Each bridge device 512, 516, 522, 526 couples the respective bus with a SATA channel interface which can address, for example, seven or eight drives. In this embodiment, 7 drives are accessed through ports 1–7 of the first system through interface card 510 and the A loop of each coupling device 530a . . . 530g associated with each drive 540a . . . 540g. The second server is coupled with the second set of seven drives 560a . . . 560g through the B loop of the coupling devices 550a . . . 550g. Each set of seven drives can be controlled, for example, in a RAID mode or any other appropriate mode depending on the type of controller in the interface card. In this embodiment the controllers in the bridge units 512, 516, 522, and 526 control the setting of the multiplexers 121, 122, and 123 to either couple the A loop or the B loop with the respective SATA drive through respective control lines provided through the fibre channel connectors.

FIG. 6 shows another exemplary embodiment in which 15 drives in the storage disc system are used in a way that two servers can access all drives within the storage disc system. The storage disc system 600 comprises 15 SATA drives 640a . . . 640h and 660a . . . 660g. The interface cards 610 and 620 implemented within the storage system 600 comprise here a PCI bus and respective PCI to SATA channel bridges 612 and 616. The connection to the servers is achieved via Gigabit Ethernet controller 618. The interface card 610, 620 further comprise a CPU 617 and firmware unit 619 to control the operation of the interface card. The first port couples the first 8 drives 640a . . . 640h through a direct connection to the respective A loop of the coupling devices. The second port on interface card 610 couples the second set of seven drives 660a . . . 660g through the A loop connection. The second interface card 620 couples the same 15 drives 640a . . . 640h and 660a . . . 660g through the B loop of the coupling devices. During cluster mode controlled by switch 310, slot 15 will be used for a loop back function between the two interface cards 610 and 620. During other modes, this drive can be coupled to one of the servers. Depending on the mode of operation, the respective drive in slot 8 is, thus, either coupled through the respective port in the first and second interface card or decoupled and a loop back function is established. The auto detect circuit within the respective coupling device of this SATA drive 650g detects this mode through the setting of the switch and the drive identification and, thus, loops back the information sent by the controller of the first interface card 610 to the controller of the second interface card 620 and vice versa. Thus, a user can select different modes of operation of a storage system having a plurality of SATA drives. The use of the coupling device for each SATA drive allows for more than one operation mode. As explained above, either normal operation mode or a cluster operation mode can be established. In addition, multiple other modes can be established. To this end, different internal wiring using the stable and rugged fibre connectors can set also different operation modes. For example, RAID solutions with and without redundancy, single split bus operation with no redundancy, single bus operation using only a single server accessing all drives, thus, disabling the second interface, etc. are possible.

The invention, therefore, is well adapted to carry out the objects and attain the ends and advantages mentioned, as well as others inherent therein. While the invention has been depicted, described, and is defined by reference to exemplary embodiments of the invention, such references do not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. Coupling device for a SATA drive having a SATA connector, comprising:
a second connector having a plurality of connector pins, wherein the SATA connector has a number of connector pins which are less than the number of pins of the second connector and wherein the second connector provides a first and second SATA channel;

a coupling unit for coupling the SATA connector and the second connector, wherein the coupling unit comprises a multiplexer unit for selectively establishing in a first mode a coupling of one of the SATA channels with the SATA drive and in a second mode for establishing a loop back function by coupling the first and second SATA channel.

2. Device as claimed in claim 1, wherein the coupling unit comprises a comparator for comparing a drive identification number provided by the second connector with a predetermined drive number.

3. Device as claimed in claim 2, wherein the second connector is a fibre channel connector.

4. Device as claimed in claim 1, wherein the coupling unit receives control signals from the second connector to either couple a first or a second SATA channel with the SATA drive.

5. Device as in claim 4, wherein the multiplexer configuration comprises a first multiplexer for either coupling the transmit lines of first or second SATA channel with the SATA drive and a second and third multiplexer for either establishing a loop back function or coupling the receiving lines of the first or second SATA channel with the SATA drive.

6. Device as in claim 1, further comprising a voltage regulator for supplying a supply voltage to the components, wherein the supply voltage is received from one of the excess pins of the second connector.

7. Storage system comprising:

a plurality of SATA drives, wherein each SATA drive comprises a coupling device for the SATA drive having a SATA connector, a second connector having a plurality of connector pins, wherein the SATA connector has a number of connector pins which are less than the number of pins of the second connector and wherein the second connector provides a first and second SATA channel, and a coupling unit for coupling the SATA connector and the second connector, wherein the coupling unit comprises a multiplexer unit for selectively establishing in a first mode a coupling of one of the SATA channels with the SATA drive in a second mode for establishing a loop back function by coupling the first and second SATA channel.

8. System as claimed in claim 7, wherein the second connector is a fibre channel connector.

9. System as claimed in claim 7, further comprising a backplane having a plurality of connectors for coupling for establishing connections with the respective second connectors.

10. System as claimed in claim 9, wherein the backplane comprises a mode select switch for determining a mode of operation coupled with each of the plurality of connectors.

11. System as claimed in claim 7, further comprising at least one controller for controlling the operation of the plurality of SATA drives, wherein the controller comprises a SATA bridge for coupling a server with the system.

12. System as claimed in claim 11, wherein two controllers are provided and wherein each controller may control the first or the second SATA channel of each coupling device.

13. System as claimed in claim 9, wherein each of the plurality of connectors provides information about the drive identification number.

14. System as claimed in claim 7, further comprising a supply voltage unit providing a supply voltage through one of the excess pins of the second connector.

* * * * *